United States Patent
Luff et al.

(10) Patent No.: US 10,288,805 B2
(45) Date of Patent: May 14, 2019

(54) COUPLING BETWEEN OPTICAL DEVICES

(75) Inventors: Bradley Jonathan Luff, San Marino, CA (US); Mehdi Asghari, Pasadena, CA (US); Dazeng Feng, El Monte, CA (US)

(73) Assignee: Mellanox Technologies Silicon Photonics Inc., Monterey Park, CA (US)

(*) Notice: Subject to any disclaimer, the term of this patent is extended or adjusted under 35 U.S.C. 154(b) by 1796 days.

(21) Appl. No.: 13/385,339

(22) Filed: Feb. 13, 2012

(65) Prior Publication Data
US 2013/0209033 A1     Aug. 15, 2013

(51) Int. Cl.
*G02B 6/12* (2006.01)
*G02B 6/122* (2006.01)

(52) U.S. Cl.
CPC .. *G02B 6/1228* (2013.01); *G02B 2006/12061* (2013.01); *G02F 2201/00* (2013.01); *G02F 2201/06* (2013.01); *G02F 2201/063* (2013.01); *G02F 2201/066* (2013.01); *G02F 2201/07* (2013.01); *Y10T 29/49117* (2015.01)

(58) Field of Classification Search
CPC ............... G02B 6/1228; G02F 2201/00; G02F 2201/06; G02F 2201/063; G02F 2201/066; G02F 2201/07
USPC ....................................................... 385/43, 50
See application file for complete search history.

(56) References Cited

U.S. PATENT DOCUMENTS

| | | | |
|---|---|---|---|
| 6,108,478 A * | 8/2000 | Harpin et al. | 385/129 |
| 6,442,315 B1 * | 8/2002 | Rhee et al. | 385/43 |
| 6,580,850 B1 * | 6/2003 | Kazarinov et al. | 385/28 |
| 6,760,520 B1 * | 7/2004 | Medin et al. | 385/43 |
| 7,663,210 B2 * | 2/2010 | Karkkainen | 257/671 |
| 2003/0053756 A1 * | 3/2003 | Lam et al. | 385/49 |
| 2003/0081902 A1 * | 5/2003 | Blauvelt et al. | 385/50 |
| 2007/0196049 A1 * | 8/2007 | Gunn, III | 385/40 |
| 2008/0056638 A1 * | 3/2008 | Glebov et al. | 385/9 |
| 2009/0324173 A1 * | 12/2009 | Asghari | 385/52 |

* cited by examiner

*Primary Examiner* — Ryan A Lepisto
*Assistant Examiner* — Erin D Chiem
(74) *Attorney, Agent, or Firm* — Gavrilovich, Dodd & Lindsey, LLP

(57) ABSTRACT

A base device has a first waveguide positioned on a first base. The waveguide is at least partially defined by a ridge extending away from the first base. An auxiliary optical device has a second waveguide positioned on a second base. The second optical device is immobilized on the base device such that the second waveguide is between the first base of the first optical device and the second base of the auxiliary device. The first waveguide is optically aligned with the second waveguide such that the first waveguide and second waveguides can exchange optical signals.

18 Claims, 7 Drawing Sheets

COUPLING BETWEEN OPTICAL DEVICES

FIELD

The present invention relates to optical devices and more particularly to optically coupled devices.

BACKGROUND

A variety of optical devices have one or more waveguides positioned on base. The waveguides often guide light signals to other optical components such as modulators, switches, demultiplexers, and light sensors. These waveguides often receive the light signals from a second optical device and/or or guide the light signals to the second optical device. Accordingly, the light signals are often transferred between a waveguide on the optical device and a second waveguide on the second optical device.

The mode size for the waveguide on first optical device is often different than mode size of the second optical device. For instance, the mode size of waveguides on planar optical devices is often much smaller than the mode size of the optical fibers with which the planar optical device exchanges light signals. This mismatch of mode sizes is often addressed by adding a taper to the waveguide that exchanges light signals with the second optical device. For instance, the waveguide on a planar optical device can be tapered such that the mode size of a light signal carried in the waveguide expands to the mode size of the optical fiber with which the waveguide will exchange light signals.

Fabrication of a tapered waveguide on an optical device can interfere with fabrication of the other components on the same optical device. The fabrication challenges become even more evident when the taper is two-dimensional. As a result, there is need for a system that permits the exchange of light signals between different optical devices without complicating the fabrication process.

SUMMARY

A system includes a base device that has a first waveguide positioned on a first base. The first waveguide is at least partially defined by a ridge extending away from the first base. An auxiliary optical device has a second waveguide positioned on a second base. The second optical device is immobilized on the base device such that the second waveguide is between the first base of the first optical device and the second base of the auxiliary device. The first waveguide has a first waveguide facet optically aligned with a first facet of the second waveguide such that the first waveguide and second waveguides can exchange optical signals.

In some instances, the second waveguide on the auxiliary device terminates at the first facet and also at a second facet. The second waveguide provides a direct optical pathway between the first facet and the second facet. The second waveguide includes a tapered region and the facet is optically aligned with a facet of an optical fiber.

Methods of fabricating the system are also disclosed.

BRIEF DESCRIPTION OF THE FIGURES

FIG. 5A is a topview of the system. FIG. 5B is a cross section of the system shown in FIG. 5A taken through a waveguide on the base device and the second waveguide on the auxiliary device.

DESCRIPTION

A system includes a base device having a first waveguide positioned on a base. The base device also includes a recess sized to receive an auxiliary device. The auxiliary device includes a second waveguide positioned on a base. The auxiliary device is positioned in the recess with the second waveguide located between the base of the base device and the base of the auxiliary device. The auxiliary device is positioned in the recess such that a facet of the second waveguide is aligned with a facet of the first waveguide. As a result, the first waveguide and the second waveguide can exchange light signals. This configuration allows the base device to be fabricated separately from the auxiliary device. As a result, the fabrication of features on the auxiliary device does not interfere with fabrication of features on the base device.

In some instances, the second waveguide terminates at a first facet and at a second facet and includes a taper. The first facet is the facet aligned with the facet of the first waveguide. The taper is configured to change the mode size of a light signal traveling between the first facet and the second facet. The second facet can then be aligned with an external optical device that is not part of the auxiliary device. Accordingly, the auxiliary device can act as a mode transformer between the base device and the external optical device. For instance, the auxiliary device can receive a light signal from the external device and then transform the mode of the received light signal to a mode that is proper for the first waveguide. The first waveguide would then receive the transformed light signal from the auxiliary device. Additionally or alternately, the system can be operated in reverse with light signals traveling from the base device to the external device.

In some instances, the external device is an optical fiber. As a result, the second waveguide can transform the mode between sizes that are proper for optical fibers and sizes that are proper for planar optical devices. Further, the system allows the taper in the second waveguide to be fabricated separately from the base. As a result, the fabrication of the taper on the second waveguide does not affect the fabrication of components on the base device.

Figure 1A:
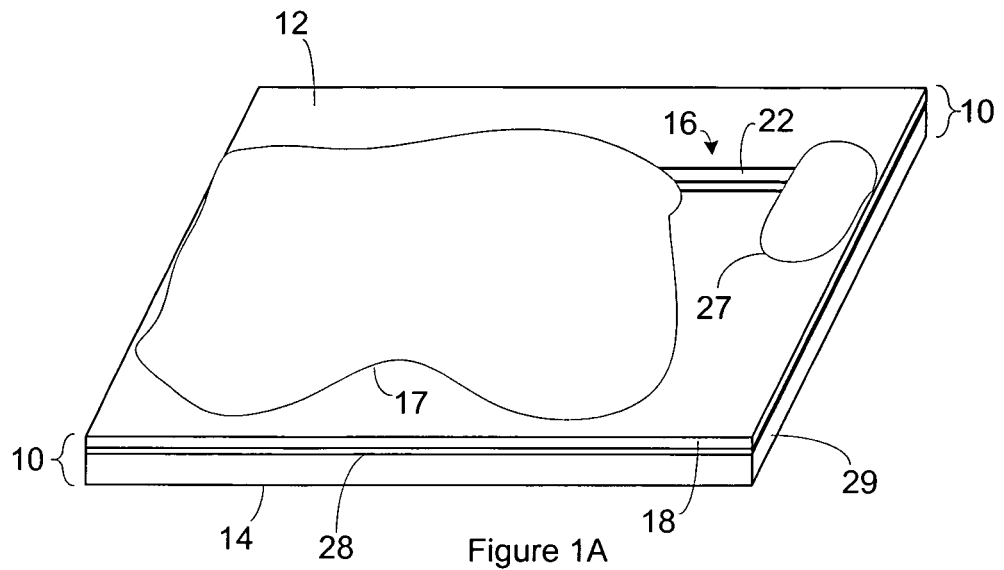
FIG. 1A is perspective view of an optical device that serves as a base device.
Figure 1B:
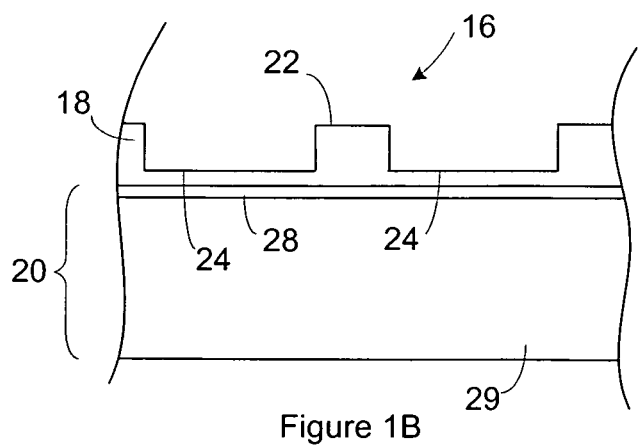
FIG. 1B is a cross section of the base device shown in FIG. 1A taken along the line labeled B in FIG. 1A.

FIG. 1A is perspective view of an optical device that serves as a base device. FIG. 1B is a cross section of the base device shown in FIG. 1A taken along the line labeled B in FIG. 1A. The base device is within the class of optical devices known as planar optical devices. Planar optical devices typically include one or more waveguides immobilized relative to a substrate or a base. The direction of propagation of light signals along the waveguides is generally parallel to a horizontal plane of the base device. Examples of a horizontal plane of the base device include the topside of the base, the bottom side of the base, the topside of the substrate, and/or the bottom side of the substrate.

The illustrated base device includes lateral sides 10 (or edges) extending from a topside 12 to a bottom side 14. The propagation direction of light signals along the length of the waveguides on a planar optical device generally extends through the lateral sides 10 of the device. The topside 12 and the bottom side 14 of the base device are non-lateral sides.

The base device includes one or more first waveguides 16 that each guides light signals to and/or from optical components 17. Examples of optical components 17 that can be included on the base device include, but are not limited to, one or more components selected from a group consisting of facets through which light signals can enter and/or exit a waveguide, entry/exit ports through which light signals can enter and/or exit a waveguide from above or below the base device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, modulators that convert a light signal to an electrical signal, and vias that provide an optical pathway for a light signal traveling through the base device from the bottom side 14 of the base device to the top side 12 of the base device. Additionally, the base device can optionally include electrical components. For instance, the base device can include electrical connections for applying a potential or current to a waveguide and/or for controlling other components on the base device.

The first waveguide 16 is defined in a light-transmitting medium 18 positioned on a base 20. For instance, a portion of the first waveguide 16 is partially defined by a ridge 22 extending upward from a slab region of the light-transmitting medium 18 as shown in FIG. 1B. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and LiNbO$_3$. One or more cladding layers (not shown) are optionally positioned on the light-transmitting medium 18. The one or more cladding layers can serve as a cladding for the first waveguide 16 and/or for the base device. When the light-transmitting medium 18 is silicon, suitable cladding layers include, but are not limited to, silicon, polymers, silica, SiN, GaAs, InP and LiNbO$_3$.

The portion of the base 20 adjacent to the light-transmitting medium 18 is configured to reflect light signals from the first waveguide 16 back into the first waveguide 16 in order to constrain light signals in the first waveguide 16. For instance, the portion of the base 20 adjacent to the light-transmitting medium 18 can be a light insulator 28 with a lower index of refraction than the light-transmitting medium 18. The drop in the index of refraction can cause reflection of a light signal from the light-transmitting medium 18 back into the light-transmitting medium 18. The base 20 can include the light insulator 28 positioned on a substrate 29. As will become evident below, the substrate 29 can be configured to transmit light signals. For instance, the substrate 29 can be constructed of a light-transmitting medium 18 that is different from the light-transmitting medium 18 or the same as the light-transmitting medium 18. In one example, the base device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serve as the light insulator 28 and the silicon substrate can serve as the substrate 29.

An auxiliary device 27 is included on the base device. Although the auxiliary device 27 is shown as being centrally positioned on the base device, the auxiliary device 27 can be positioned at or adjacent to an edge of the base device. The auxiliary device 27 can exchange light signals with the base device. For instance, a second waveguide (not shown) on the auxiliary device 27 can receive light signals from the first waveguide 16 on the base device and/or can guide light signals that are received by the first waveguide 16 on the base device.

The auxiliary device 27 can generally be distinguished from the components 17 on the base device in that the auxiliary device 27 is fabricated apart form the base device and is later attached to the base device. For instance, auxiliary devices 27 are often attached to the base device through the use of solder bumps. In contrast, all or a portion of the components 17 are fabricated directly on the base device. As a result, all or a portion of the components 17 can incorporate portions of the chip or wafer from which the base device is fabricated, and/or can include materials grown directly or deposited directly onto the chip or wafer from which the base device is fabricated. An example of a component 17 that incorporates a portion of a chip is a modulator that uses the silica layer of a silicon-on-insulator wafer as a light insulator or a light sensor that uses a ridge formed in the silicon layer of the silicon-on-insulator wafer as a waveguide. An example of a component 17 that include materials grown directly or deposited directly onto the chip includes a modulator that uses germanium grown directly on the silicon of a silicon-on-insulator wafer as a light insulator.

In some instances, the auxiliary device 27 is a planar optical device. Accordingly, in some instances, the auxiliary device 27 includes optical components in addition to the second waveguide. The second waveguide can guide light signals to and/or from optical components on the auxiliary device 27. In one example, the auxiliary device 27 excludes optical components other than the second waveguide. In another example, the auxiliary device 27 excludes optical components other than the second waveguide and the second waveguide includes a taper for changing the mode size of a light signal guide by the second waveguide.

Figure 2:
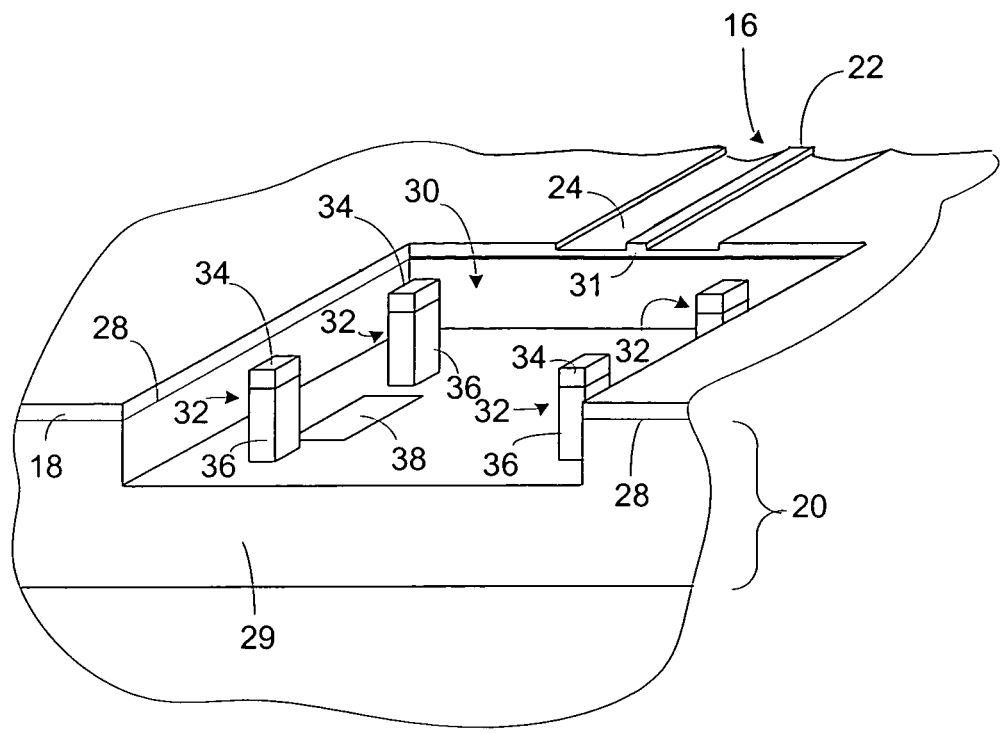
FIG. 2 is a perspective view of a portion of a base device that includes an interface for optically coupling the base device with an auxiliary device.

FIG. 2 is a perspective view of a portion of a base device that includes an interface for optically coupling the base device with an auxiliary device. The illustrated portion of the base device includes an auxiliary recess 30 sized to receive the auxiliary device. The auxiliary recess 30 extends through the light-transmitting medium 18 and into the base 20. In the illustrated version, the auxiliary recess 30 extends through the light-transmitting medium 18, the light insulator 28, and into the substrate 29.

The base device includes a first waveguide 16 that terminates at the auxiliary recess 30. For instance, the first waveguide 16 ends at a facet 31 positioned such that a light signal that exits the first waveguide 16 though the facet 31 can be received by an auxiliary device positioned in the auxiliary recess 30. Although not shown, the facet 31 of the first waveguide 16 can include an anti-reflective coating. A suitable anti-reflective coating includes, but is not limited to, single-layer coatings such as silicon nitride or aluminum oxide, or multilayer coatings, which may contain silicon nitride, aluminum oxide, and/or silica.

One or more stops 32 extend upward from a bottom of the auxiliary recess 30. For instance, FIG. 2 illustrates four stops 32 extending upward from the bottom of the auxiliary recess 30. The stops 32 include a cladding 34 positioned on a base portion 36. The substrate 29 can serve as the base portion 36 of the stops 32 and the stop 32 can exclude the light insulator 28. The portion of the substrate 29 included in the stops 32 can extend from the bottom of the auxiliary recess 30 up to the level of the light insulator 28. For instance, the stops 32 can be formed by etching through the light insulator 28 and using the underlying substrate 29 as an etch-stop. As a result, the location of the top of the base portion 36 relative to the optical mode of a light signal in the first waveguide 16 is well known because the light insulator 28 defines the bottom of the second waveguide and the top of the base portion 36 is located immediately below the light insulator 28. As will be described in more detail below, the cladding 34 is formed on base portion 36 of the stops 32 so as to provide the stops 32 with a height that will provide the desired alignment between the first waveguide and a second waveguide on an auxiliary device.

Attachment pads 38 are positioned on the bottom of the auxiliary recess 30. The attachment pads 38 can be used to immobilize the auxiliary device relative to the base device once the auxiliary device is positioned on the base device. In some instances, the attachment pads 38 also provide electrical communication between the base device and one or more components on the auxiliary device. Suitable attachment pads 38 include, but are not limited to, solder pads.

Figure 3:
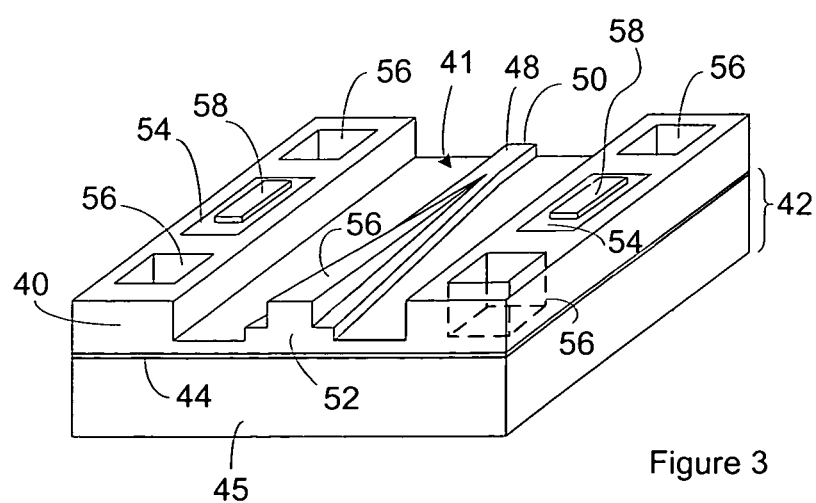
FIG. 3 is a perspective view of an auxiliary device suitable for use with the base device of FIG. 1A through FIG. 2.

FIG. 3 is a perspective view of one embodiment of the auxiliary device. The illustrated auxiliary device is within the class of devices known as planar optical devices. Additionally, the auxiliary device includes a light-transmitting medium 40 on a base 42. The base 42 includes a light insulator 44 on a substrate 45. The light-transmitting medium 40 on the auxiliary device can be the same material or different material from the light-transmitting medium 18 on the base device. The base 42 on the auxiliary device can be the same material or different material from the base 20 on the base device. The light insulator 44 on the auxiliary device can be the same material or different material from the light insulator 28 on the base device. The substrate 45 on the auxiliary device can be the same material or different material from the substrate 29 on the base device. In one examples, the light-transmitting medium 40 on the auxiliary device and the light-transmitting medium 18 on the base device are silicon, the light insulator 44 on the auxiliary device and the light insulator 28 on the base device are silica, and the substrate 45 on the auxiliary device and the substrate 29 on the base device are silicon. For instance, both the base device and the auxiliary device can be built on a silicon-on-insulator wafer.

The auxiliary device includes a second waveguide 41 that is partially defined by a ridge extending upward from slab regions of the light-transmitting medium 40 or the base 42. The second waveguide 41 includes a taper. For instance, the second waveguide 41 can include a lateral taper and/or a vertical taper. The second waveguide 41 shown in FIG. 3 includes both a lateral taper and a vertical taper. In some instances, the taper(s) are adiabatic tapers to reduce or stop the excitation of higher order modes in a light signal being guided by the second waveguide 41.

The second waveguide 41 of FIG. 3 includes an upper ridge 46 on a lower ridge 48. The lower ridge 48 tapers laterally. The upper ridge 46 tapers both laterally and vertically. Other configurations are possible. For instance, the upper ridge 46 can taper only laterally or only vertically. Further, a portion of the upper ridge 46 can include a vertical taper without a horizontal taper and a different portion of the upper ridge 46 can include a horizontal taper without a vertical taper. As is evident from FIG. 4A and FIG. 4B, the vertical taper on the upper ridge 46 can be positioned before or after the horizontal taper on the upper ridge 46. Similarly, the lower ridge 48 can taper vertically and horizontally. The vertical and horizontal taper of the lower ridge 48 can be concurrent. Alternately, a portion of the lower ridge 48 can include a vertical taper without a horizontal taper and a different portion of the lower ridge 48 can include a horizontal taper without a vertical taper. As is evident from FIG. 4C and FIG. 4D, the vertical taper on the lower ridge 48 can be positioned before or after the horizontal taper on the lower ridge 48.

Figure 4A:
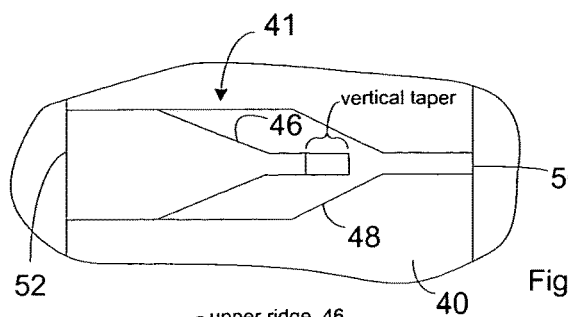
FIG. 4A through FIG. 4E illustrate alternative configurations for a tapered region included on the auxiliary device of FIG. 3.
Figure 4B:
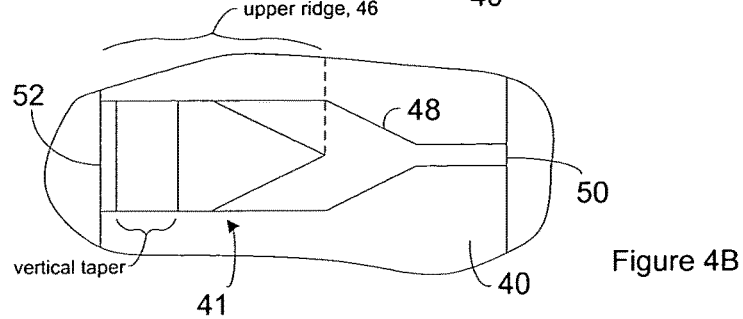
Figure 4C:
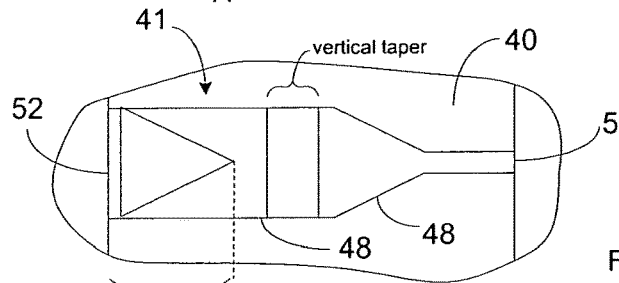
Figure 4D:
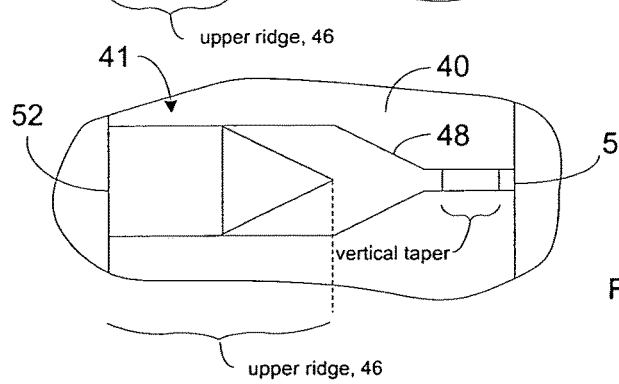
Figure 4E:
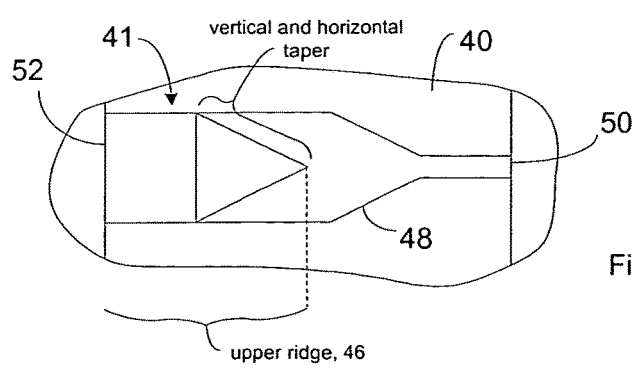

As is evident from FIG. 4B through FIG. 4E, taper of the upper ridge 46 need not be located over taper of the lower ridge 48. However, all or a portion of the taper of the upper ridge 46 can be located over the taper of the lower ridge 48 as shown in FIG. 3 and FIG. 4A. Although FIG. 3 through FIG. 4E illustrate a distinct upper ridge 46 and lower ridge 48, the sides of the upper ridge 46 and the lower ridge 48 can be merged such that the upper ridge 46 is not distinguishable from the lower ridge 48. In these instances, the ridge will appear as a single continuous ridge.

The second waveguide 41 can provide an optical pathway between a first facet 50 and a second facet 52. Although not shown, the first facet 50 and/or the second facet 52 can optionally include an anti-reflective coating. A suitable anti-reflective coating includes, but is not limited to, single-layer coatings such as silicon nitride or aluminum oxide, or multilayer coatings that may contain silicon nitride, aluminum oxide, and/or silica.

The second facet 52 can have the dimensions of a multi-mode waveguide or a single-mode waveguide and/or the first facet 50 can have the dimension of multi-mode waveguide or a single-mode waveguide. In one example, the second facet 52 has the dimensions of a multi-mode waveguide and the first facet 50 can has the dimension of multi-mode waveguide. Accordingly, the taper(s) can expand a light signal guided in the second waveguide 41 from single mode to multi-mode and/or can contract a light signal guided in the second waveguide 41 from multi-mode to single mode.

The second waveguide 41 of FIG. 3 provides an optical pathway directly between the second facet 52 and the first facet 50. For instance, the auxiliary devices excludes optical components that perform additional processing on a light signal guided between the second facet 52 and the first facet 50.

The auxiliary device includes one or more attachment pads 54 that can be employed to immobilize the auxiliary device relative to the base device. Suitable attachment pads 54 include, but are not limited to, solder pads.

The auxiliary device also includes one or more alignment recesses 56. The dashed lines in FIG. 3 show the depth and shape of one of the alignment recesses 56. In some instances, the alignment recesses 56 extend down to the light insulator 44. When the alignment recesses 56 extend down to the light insulator 44 the alignment recesses 56 can be formed by etching into the light-transmitting medium 40 using an etch where the light insulator 44 acts as an etch stop. In some instances, the alignment recesses 56 extend through the light insulator 44 to the top of the substrate 45. When the alignment recesses 56 extend through to the light insulator 44 the alignment recesses 56 can be formed by etching through the light insulator 44 using an etch where the material of the substrate 45 acts as an etch stop. Whether the alignment recesses 56 extend down to the light insulator 44 or down to the substrate 45, the depth of the alignment recesses 56 is not dependent on etch duration or other variables, and is accordingly consistent between different auxiliary devices. Additionally, since the alignment recesses 56 extend down to the light insulator 44 or down to the top of the substrate 45, the position of the bottom of the alignment recesses 56 relative to the optical mode of a light signal in the second waveguide 41 is well known because the light insulator 44 defines the bottom of the second waveguide 41. As a result, the recesses are suitable for achieving vertical alignment of the auxiliary device relative to the base device.

Figure 5A:
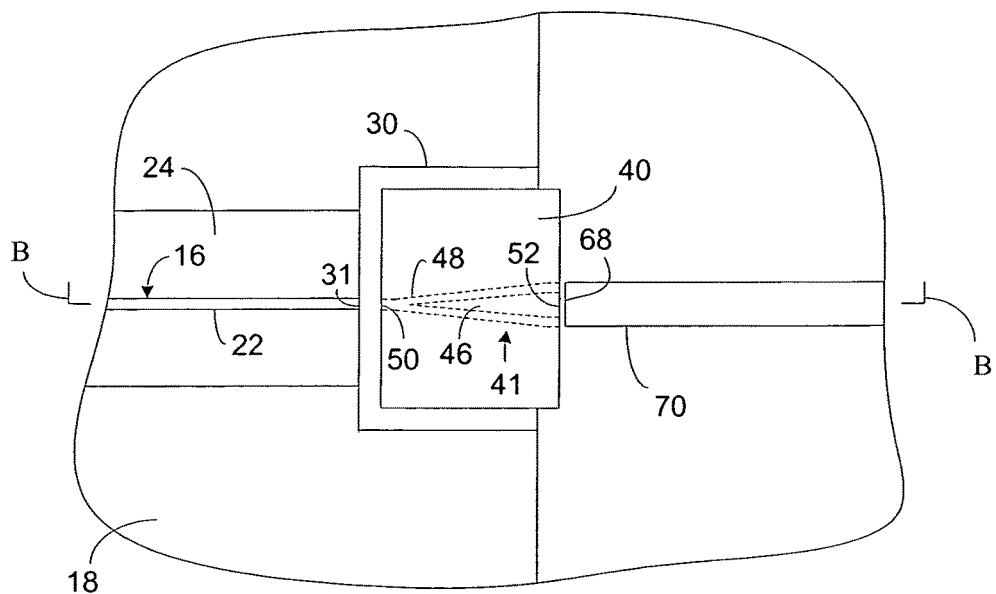
FIG. 5A and FIG. 5B illustrate system that includes the device of FIG. 2 interfaced with the auxiliary device of FIG. 3.
Figure 5B:
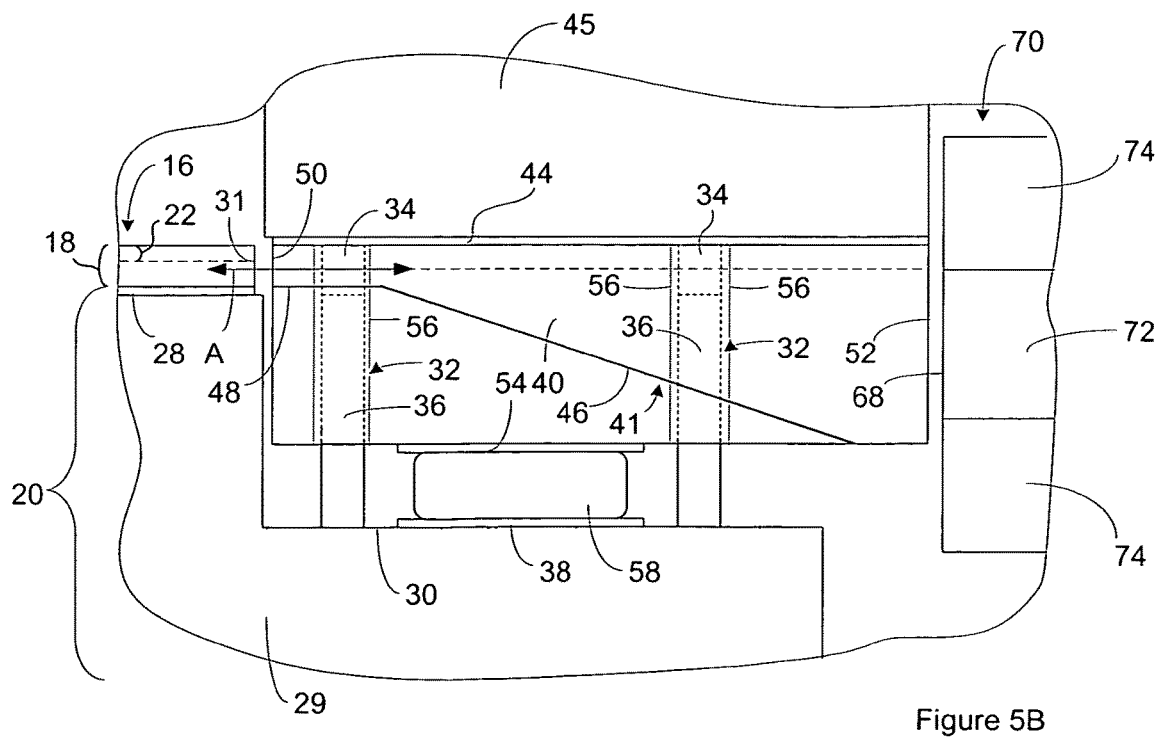

FIG. 5A and FIG. 5B illustrate system that includes the device of FIG. 2 interface with the auxiliary device of FIG. 3. FIG. 5A is a topview of the system. FIG. 5B is a cross section of the system taken through the first waveguide 16 on the base device and the second waveguide 41 on the auxiliary device. FIG. 5A and FIG. 5B each includes dashed lines that illustrate features that are located behind other features in the system. For instance, FIG. 5A includes dashes lines showing the location of the second waveguide 41 even though the second waveguide 41 is located under the base 42 of the auxiliary device. Additionally, FIG. 5B includes dashed lines that illustrate the locations of the portion of the stops 32 and alignment recesses 56 located behind the ridge of the second waveguide 41. FIG. 5 also includes dashed lines that illustrate the location where the ridge 22 of the first waveguide 16 interfaces with slab regions of the base device and also dashed lines that illustrate the location where the ridge 22 of the second waveguide 41 interfaces with slab regions of the auxiliary device.

The auxiliary device is positioned in the auxiliary recess 30 on the base device. The auxiliary device is positioned such that the second waveguide 41 is located between the base 42 of the auxiliary device and the base 20 of the base device. Accordingly, the auxiliary device is inverted in the auxiliary recess 30. Solder or other adhesive 58 contacts the attachment pads 38 on the bottom of the auxiliary recess 30 and the attachment pads 54 on the auxiliary device. For instance, the solder or other adhesive 58 extends from an attachment pad 38 on the bottom of the auxiliary recess 30 to an attachment pad 54 on the auxiliary device. Accordingly, the solder or other adhesive 58 immobilizes the auxiliary device relative to the base device.

The facet 31 of the first waveguide is aligned with the first facet 50 of the second waveguide 41 such that the first waveguide and the second waveguide 41 can exchange light signals. As shown by the line labeled A, the system provides a horizontal transition path in that the direction that the light signal travels when between the base device and the auxiliary device is horizontal or is substantially horizontal. The horizontal direction can be a result of the facet 31 of the first waveguide being perpendicular to the base 20 of the base device or substantially perpendicular to the base 20 of the base device and/or the first facet 50 of the second waveguide 41 being perpendicular to the base 42 of the auxiliary device or substantially perpendicular to the base 42 of the auxiliary device. In some instances, the first facet 50 of the second waveguide 41 is also perpendicular to the base 20 of the base device or substantially perpendicular to the base 20 of the base device. A top of the first facet 50 of the second waveguide 41 is at a level that is below the top of the facet 31 of the first waveguide. For instance, the facet 31 of the first waveguide and the first facet 50 of the second waveguide 41 each have a height above a horizontal plane on the base device. The height of the top of the facet 31 of the first waveguide relative to the plane is more than the height of the top of the first facet 50 of the second waveguide 41 relative to the plane. As discussed above, examples of a horizontal plane of the base device include the topside of the base 20, the bottom side of the base 20, the topside of the substrate 29, and/or the bottom side of the substrate 29.

As noted, the facet 31 of the first waveguide can be perpendicular or substantially perpendicular to the base 20 of the base device. Although not shown, the facet 31 of the first waveguide can also be angled at less than 90 degrees relative to the direction or propagation of a light signal in the first waveguide. An angle of less than 90 degrees can reduce the effects of back reflection in the first waveguide. As noted, the first facet 50 of the second waveguide 41 can be perpendicular or substantially perpendicular to the base 42 of the auxiliary device and/or the base 20 of the base device. Although not shown, the first facet 50 of the second waveguide 41 can also be angled at less than 90 degrees relative to the direction or propagation of a light signal in the second waveguide 41. An angle of less than 90 degrees can reduce the effects of back reflection in the second waveguide 41.

The one or more stops 32 on the base device are each received within one of the alignment recesses 56 on the auxiliary device. The top of each stop 32 contacts the bottom of the alignment recess 56. As a result, the interaction between stops 32 and the bottom of the alignment recesses 56 prevent additional movement of the auxiliary device toward the base device. In some instances, the auxiliary device rests on top of the stops 32.

As is evident from FIG. 5B, the first facet 50 of the auxiliary device is vertically aligned with the facet 31 of the first waveguide 16 on the base device. As is evident from FIG. 5A, the first facet 50 of the auxiliary device is horizontally aligned with the facet 31 of the first waveguide 16 on the base device. The horizontal alignment can be achieved by alignment of marks and/or features on the auxiliary device and the base device. As a result, the second waveguide 41 on the auxiliary device and the first waveguide 16 on the base device can exchange light signals.

The vertical alignment is achieved by controlling the height of the stops 32 on the base device. For instance, the cladding 34 on the base portion 36 of the stops 32 can be grown to the height that places the first facet 50 of the second waveguide 41 at a particular height relative to the facet 31 of the first waveguide 16 on the base device. As noted above, the position of the bottom of the alignment recess 56 relative to the first facet 50 and/or optical mode of the second waveguide 41 is known. Additionally, the position of the tops of the base portion 36 of the stops 32 relative to the first waveguide and/or optical mode in the first waveguide is also known. This information can be used to determine the thickness of the cladding 34 that will provide the second waveguide 41 with the desired vertical location relative to the first waveguide. The desired cladding 34 thickness can be accurately achieved by using deposition techniques such as evaporation, plasma enhanced chemical vapor deposition (PECVD), and/or sputtering to deposit the one or more cladding layers. As a result, one or more cladding layers can be deposited on the base portion 36 of the stops 32 so as to form the stops 32 to a height that provides the desired vertical alignment. Suitable materials for layers of the cladding 34 include, but are not limited to, silica, silicon nitride, and polymers.

The second facet 52 of the second waveguide 41 is shown aligned with the facet 68 of an optical fiber 70 having a fiber core 72 and a fiber cladding 74. The optical mode(s) guided by optical fibers 70 typically have larger dimensions than the optical mode(s) guided by planar optical devices. As a result, the one or more tapers included in the second waveguide 41 can act as a mode transformer for light signals being exchanged between the optical fiber 70 and the first waveguide 16 on the base device. For instance, the one or more tapers included in the second waveguide 41 change the dimensions of the mode(s) guided by the second waveguide 41 as light signals are exchanged between the optical fiber 70 and the first waveguide 16. Since the mode transformer can be fabricated on the auxiliary optical device, the fabrication of the mode transformer does not affect the fabrication of the components on the base device and/or the fabrication of the fabrication of the components on the base device does not affect the fabrication of the mode transformer. Accordingly, the system permits optical devices that are fabricated separate from one another to be integrated into a single system.

The optical fiber 70 can be aligned with the second facet 52 of the second waveguide 41 using traditional alignment techniques. For instance, an adhesive can be employed to immobilize the facet 68 of the optical fiber 70 relative to the second facet 52 of the second waveguide 41. Suitable adhesives include, but are not limited to, epoxies. Other methods of aligning the optical fiber 70 with the second facet 52 of the second waveguide 41 include, but are not limited to, v-groove alignment, and lens coupling.

Figure 6:
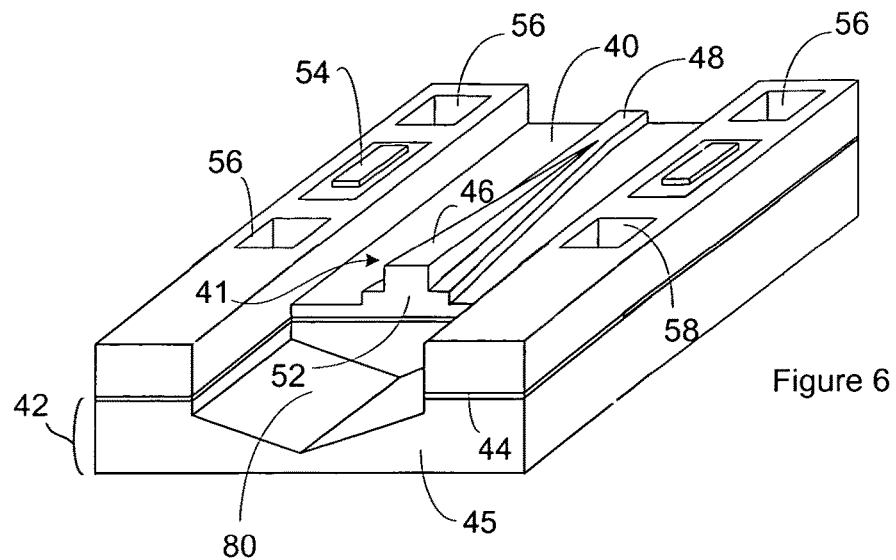
FIG. 6 illustrates the auxiliary device of FIG. 5A and FIG. 5B modified for passive alignment of an optical fiber with the expanded facet.

FIG. 6 illustrates the auxiliary device of FIG. 5A and FIG. 5B modified for passive alignment of an optical fiber with the second facet 52. Accordingly, the auxiliary device is suitable for use with a base device as shown in the system of FIG. 5A and FIG. 5B. The base 42 of the auxiliary device includes a v-groove 80. The end of an optical fiber positioned in the v-groove 80 of the auxiliary device is aligned with the second facet 52 of the second waveguide 41. Once the end of the optical fiber positioned in the v-groove 80, an adhesive can be employed to immobilize the facet 68 of the optical fiber relative to the second facet 52 of the second waveguide 41 and/or to immobilize the end of the optical fiber relative to the v-groove 80. Suitable adhesives include, but are not limited to, epoxies, and solder (if the fiber is metalized).

Although each of the above embodiments show the second waveguide 41 including a taper, the second waveguide in each of the above embodiments can exclude a taper and still provide an optical pathway directly between the second facet 52 and the first facet 50. For instance, the above auxiliary devices can include a second waveguide that is not tapered and can also exclude optical components that perform additional processing on a light signal guided between the second facet 52 and the first facet 50.

Figure 7:
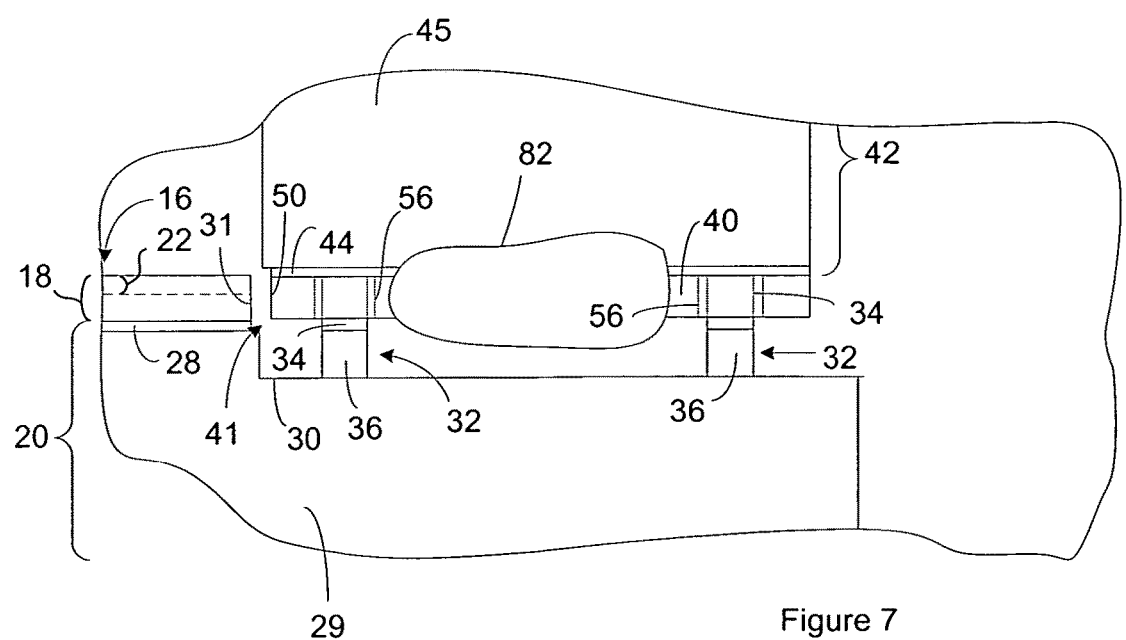
FIG. 7 is a cross section of a system that includes a base device aligned with an auxiliary device that includes optical components in addition to a second waveguide.

Although the device is shown above as having a single tapered second waveguide 41 and excluding other optical components. The auxiliary device can include additional optical components 82 as shown in FIG. 7. FIG. 7 is a cross section of a system that includes a base device aligned with an auxiliary device that includes optical components 82 in addition to a second waveguide 41. The cross section is taken through the first waveguide 16 on the base device and the second waveguide 41 on the auxiliary device.

Examples of optical components 82 that can be included on the auxiliary device include, but are not limited to, one or more components selected from a group consisting of facets through which light signals can enter and/or exit a waveguide, entry/exit ports through which light signals can enter and/or exit a waveguide from above or below the auxiliary device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, modulators that convert an light signal to an electrical signal, and vias that provide an optical pathway for a light signal traveling through the auxiliary device from the bottom side of the auxiliary device to the top side of the auxiliary device. Additionally, the auxiliary device can optionally, include electrical components. For instance, the auxiliary device can include electrical connections for applying a potential or current to a waveguide and/or for controlling other components on the auxiliary device.

Figure 8:
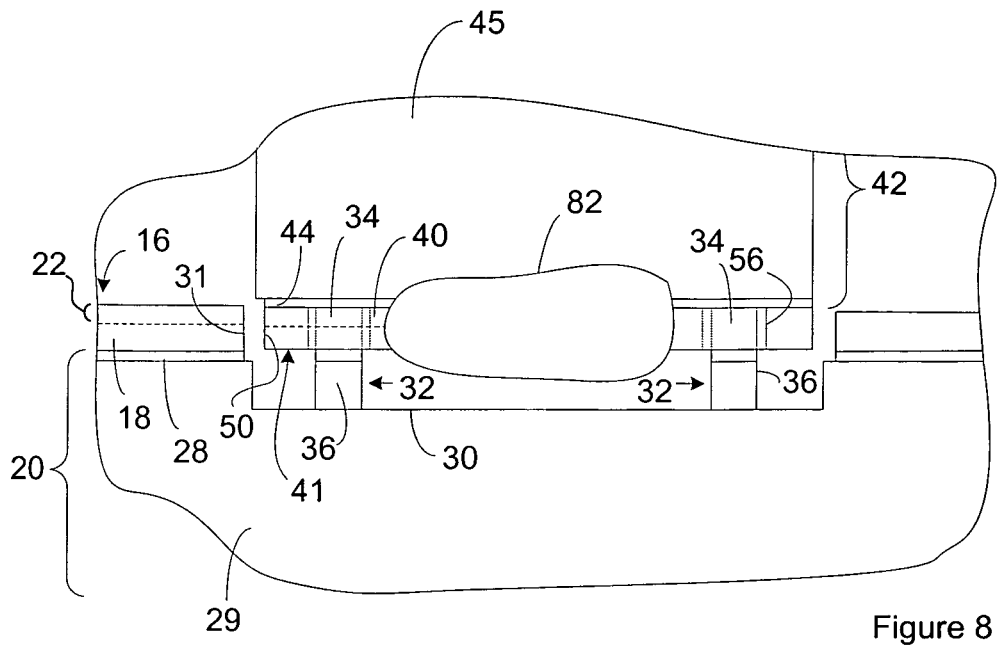
FIG. 8 is a cross section of a system that includes a base device aligned with an auxiliary device.

The above illustrations of the system show the auxiliary device located at an edge of the base device. However, an auxiliary device can be centrally located on the base device. FIG. 8 is a cross section of a system that includes a base device aligned with an auxiliary device. The cross section is taken through the first waveguide 16 on the base device and the second waveguide 41 on the auxiliary device. The auxiliary device is centrally located on the base device. As a result, in some instances, the auxiliary recess 30 surrounds the auxiliary device.

Figure 9:
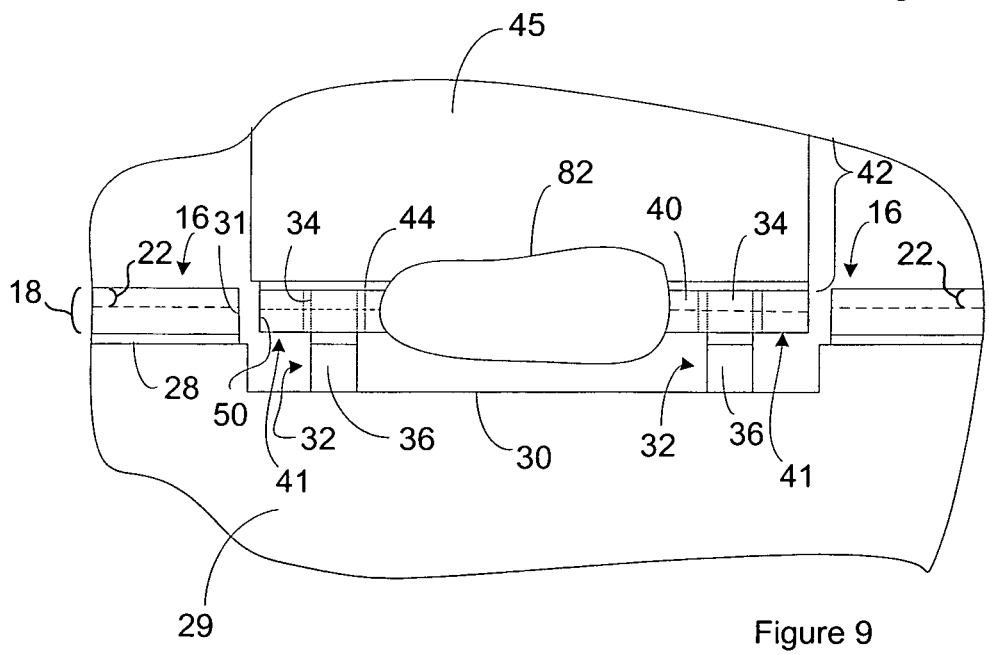
FIG. 9 is a cross section of a system that includes a base device aligned with an auxiliary device.

FIG. 8 shows a second waveguide 41 on one side of the auxiliary device aligned with a first waveguide 16 on the base device. However, the facets of more than one first waveguide on the base device can be aligned with a facet on the auxiliary device. FIG. 9 is a cross section of a system that includes a base device aligned with an auxiliary device. The cross section is taken through the first waveguide 16 on the base device and the second waveguide 41 on the auxiliary device. The auxiliary device includes two second waveguides 41 that each ends at a facet. The facet of each second waveguide 41 is aligned with the facet of a first waveguide 16 on the base device.

Figure 10:
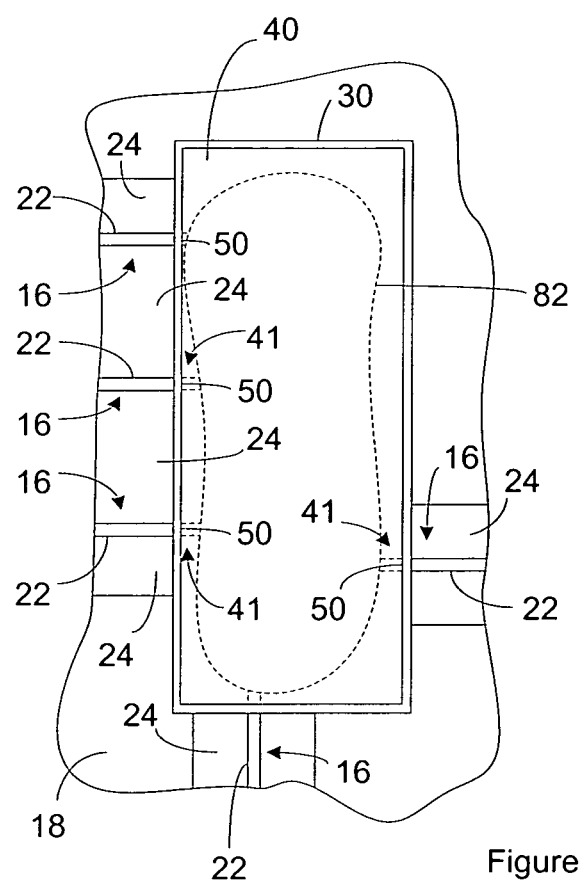
FIG. 10 is a topview of a system that includes a base device aligned with an auxiliary device.

The above characteristics make the system suitable for interfacing an array of waveguides on the base device with an auxiliary device that also includes an array of waveguides. For instance, FIG. 10 is a topview of a system that includes a base device aligned with an auxiliary device. FIG. 10 includes dashed lines the illustrate features that are located behind other features in the system. For instance, FIG. 10 includes dashes lines showing the location of second waveguides 41 and one or more optical components 82 even though the second waveguides 41 and one or more optical components 82 are located under the base 42 of the auxiliary device. FIG. 10 shows an array of three second waveguides 41 on the auxiliary device that are each aligned with a first waveguide 16 on the base device. In these instances, the one or more components 82 can include multiple lasers or multiple light sensors. As a result, the system is suitable for interfacing a single device that includes an array of lasers and/or light sensors with a base device.

Although FIG. 8-10 show the auxiliary device centrally located on the base device, these systems can also be the auxiliary device located at an edge of the base device. Additionally or alternately, although FIGS. 8-10 show the auxiliary device as including one or more optical components 82, the auxiliary device can include one or more second waveguides 41 that include tapers or exclude tapers.

The base device and/or the auxiliary device can be fabricated using traditional technologies for fabrication of integrated circuit, optoelectronics circuits, and/or optical circuits.

Although the above illustrations show a single auxiliary device on a base device, the system can include multiple auxiliary devices on a single base device. Further, the system can be nested in that it includes an auxiliary device on a base device that serves as an auxiliary device for another base device and so on.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical system, comprising:
a base device having a first waveguide positioned on a first base, the first waveguide being at least partially defined by a ridge extending away from the first base; and
an auxiliary device that serves as an interface between the base device and an optical fiber, the auxiliary device having a second waveguide positioned on a second base,
the second waveguide being between the first base of the base device and the second base of the auxiliary device,
the first waveguide having a first waveguide facet optically aligned with a first facet of the second waveguide such that the first waveguide and the second waveguide can exchange optical signals,
a height of a top of the first waveguide facet being above a height of a top of the first facet of the second waveguide, and
the second waveguide including a tapered region.

2. The system of claim 1, wherein the second waveguide terminates at the first facet and also at a second facet, the first facet being aligned with a facet of the first waveguide.

3. The system of claim 2, wherein the second facet has dimensions that exceed dimensions of the first facet.

4. The system of claim 3, wherein the second facet has dimensions of a multimode waveguide and the first facet has dimensions of a single mode waveguide.

5. The system of claim 3, wherein the second facet is aligned with a facet of an optical fiber.

6. The system of claim 5, wherein the second facet has dimensions of a multimode waveguide and the first facet has dimensions of a single mode waveguide.

7. The system of claim 1, wherein the second waveguide is configured to guide a light signal through a light-transmitting medium located in an interior of a recess that extends into the first base of the base device.

8. The system of claim 7, wherein the light-transmitting medium includes a vertically tapered portion that extends into the interior of the recess that extends into the first base of the base device.

9. The system of claim 7, wherein the auxiliary device excludes optical components other than the second waveguide.

10. The system of claim 1, wherein the base device and the auxiliary device are both planar optical devices.

11. The system of claim 1, wherein the base device and the auxiliary device are both constructed on a silicon-on-insulator wafer.

12. The system of claim 1, wherein base device includes stops that extends into one or more recesses on the auxiliary device.

13. The system of claim 1, wherein the first base of the base device is a planar substrate and the second base of the auxiliary device is a planar substrate.

14. The system of claim 13, wherein the planar substrate that serves as base of the base device is a silicon substrate and the planar substrate that serves as the base of the auxiliary device is a silicon substrate.

15. The system of claim 1, wherein the first waveguide facet is perpendicular relative to the first base and the first facet of the second waveguide is perpendicular relative to the second base.

16. The system of claim 1, wherein the second waveguide terminates at the first facet and also at a second facet and the second waveguide provides an optical pathway directly between the first facet and the second facet.

17. The system of claim 1, wherein base device includes stops extending upward from a platform, and the auxiliary device includes a light-transmitting medium positioned on the second base such that the second waveguide is configured to guide a light signal through the light-transmitting medium, recesses extending into the light-transmitting medium and a bottom of the recesses being in contact with tops of the stops.

18. A method of fabricating an optical system, comprising:
providing a base device having a first waveguide positioned on a first base, the first waveguide being at least partially defined by a ridge extending away from the first base;
providing an auxiliary device having a second waveguide positioned on a second base, the second waveguide including a tapered region; and
attaching the auxiliary device to the base device such that the second waveguide is between the first base of the base device and the second base of the auxiliary device,
a first waveguide facet of the first waveguide is optically aligned with a first facet of the second waveguide such that the first waveguide and the second waveguide can exchange optical signals, and
a height of a top of the first waveguide facet is above a height of a top of the first facet of the second waveguide;
aligning the second waveguide of the auxiliary device with an optical fiber such that the auxiliary device serves as an interface between the base device and an optical fiber.

* * * * *